(12) United States Patent
Pozgainer et al.

(10) Patent No.: US 9,868,260 B2
(45) Date of Patent: *Jan. 16, 2018

(54) DEVICE AND METHOD FOR MANUFACTORING PLASTIC CONTAINERS

(71) Applicant: MAGNA STEYR Fuel Systems GesmbH, Sinabelkirchen (AT)

(72) Inventors: Günther Pozgainer, Graz (AT); Bernhard Spary, Nestelback bei Graz (AT)

(73) Assignee: MAGNA STEYR Fuel Systems GesmbH, Sinabelkirchen (AT)

( * ) Notice: Subject to any disclaimer, the term of this patent is extended or adjusted under 35 U.S.C. 154(b) by 447 days.

This patent is subject to a terminal disclaimer.

(21) Appl. No.: 14/245,101

(22) Filed: Apr. 4, 2014

(65) Prior Publication Data

US 2014/0299263 A1   Oct. 9, 2014

(30) Foreign Application Priority Data

Apr. 4, 2013   (EP) ..................................... 13162316

(51) Int. Cl.
| | | |
|---|---|---|
| *B29D 22/00* | (2006.01) | |
| *B29C 51/22* | (2006.01) | |
| *B29C 51/26* | (2006.01) | |
| *B29C 51/38* | (2006.01) | |
| *B29L 31/00* | (2006.01) | |

(52) U.S. Cl.
CPC ............ *B29D 22/003* (2013.01); *B29C 51/22* (2013.01); *B29C 51/267* (2013.01); *B29C 51/38* (2013.01); *B29L 2031/7172* (2013.01)

(58) Field of Classification Search
CPC ....... B29C 51/22; B29C 51/267; B29C 51/38; B29C 2045/0425; B29D 22/003
USPC .................. 156/245; 425/503, 504, 518, 520
See application file for complete search history.

(56) References Cited

U.S. PATENT DOCUMENTS

| | | | | |
|---|---|---|---|---|
| 3,915,617 | A | * | 10/1975 | Saladin ................. B29C 51/082 425/301 |
| 5,843,366 | A | | 12/1998 | Shuert |
| 6,113,382 | A | | 9/2000 | McNally |
| 2006/0073230 | A1 | * | 4/2006 | Ikeda .................... B29C 31/042 425/394 |
| 2006/0113716 | A1 | * | 6/2006 | Binda ............... B29C 66/73921 264/545 |
| 2010/0282759 | A1 | * | 11/2010 | Eckhardt ............. B29C 49/0047 220/567.2 |

FOREIGN PATENT DOCUMENTS

| | | |
|---|---|---|
| CN | 2218643 Y | 1/1996 |
| CN | 1232412 A | 10/1999 |
| DE | 1147029 B | 4/1963 |

(Continued)

OTHER PUBLICATIONS

Office Action and Search Report for Chinese Patent Application No. 201410272728.X, dated Dec. 18, 2015, 8 pages including 5 pages of English translation.

*Primary Examiner* — Philip Tucker
*Assistant Examiner* — John Blades
(74) *Attorney, Agent, or Firm* — Jordan IP Law, LLC; Todd A. Vaughn

(57) ABSTRACT

A device and method for producing plastics containers, in particular plastics tanks, for example, fuel tanks of motor vehicles.

15 Claims, 10 Drawing Sheets

(56) References Cited

FOREIGN PATENT DOCUMENTS

| | | | | |
|---|---|---|---|---|
| DE | 114546 | A1 | 8/1975 | |
| EP | 1052080 | A2 | 11/2000 | |
| EP | 1314528 | A2 | 5/2003 | |
| FR | 412649 | A | 7/1910 | |
| JP | 05-163745 | * | 6/1993 | ................ E02F 9/22 |
| WO | 2004/062889 | A1 | 7/2004 | |
| WO | 2005/011455 | A1 | 2/2005 | |
| WO | 2005011455 | A1 | 2/2005 | |

* cited by examiner

DEVICE AND METHOD FOR MANUFACTORING PLASTIC CONTAINERS

CROSS-REFERENCE TO RELATED APPLICATIONS

The present application claims priority 35 U.S.C. §119 to European Patent Publication No. EP 13162316.7 (filed on Apr. 4, 2013) which is hereby incorporated by reference in its entirety.

TECHNICAL FIELD

Embodiments relate to a device and method for producing plastics containers, in particular plastics tanks, for example, fuel tanks of motor vehicles.

BACKGROUND

For the production of plastics containers, in particular plastics tanks, it is known to use the method of thermoforming, and accordingly thermoforming pressing. Also known is so-called double-layer thermoforming or double-mould thermoforming in which plastics half-shells are thermoformed simultaneously in two moulds, said plastics half-shells subsequently being fused to one another in the hot and pasty state at their edges so as to form a hollow body.

A method for the double-layer thermoforming of plastics fuel tanks and a device for producing plastics fuel tanks is known from WO Patent Publication No. WO 2004/062889 A1, wherein two heated plastics layers are moved independently of one another to a thermoforming station, wherein the individual plastics layers are lowered into a first and a second moulding die, wherein the first and second dies are arranged laterally beside one another, wherein each plastics layer is thermoformed to form a shell, and wherein one of the moulding dies is rotated together with the thermoformed shell and arranged over the other die, and finally, overlapping sealing areas of the shells are pressed together and thermally fused.

European Patent Publication No. EP 1 314 528 A2 discloses a thermoforming press for the production of moulded parts, comprising a mould support table which is suspended on a frame below a moulding die assembly and comprising a pair of moulds which are mounted side-by-side on the moulding support table, wherein a mechanism is provided for pivoting said moulding support table through an arcuate pendulum travel and for orienting and registering of one of said moulds and then the other of said moulds alternately with the moulding die assembly.

SUMMARY

Embodiments relate to an enhanced device and an enhanced method for producing plastics containers, whereby in particular energy-saving production of the plastics container is ensured.

In accordance with embodiments, a device for producing plastics containers includes at least one of: a first press table with a first mould half, and a pivot arm with a second mould half, wherein heated and thermoformed plastics half-shells may be received in the first and second mould halves, the pivot arm being moveable between a first position over the first press table, the first and second mould halves are open toward one another such that, by virtue of the first mould half being pressed onto the second mould half, the plastics half-shells received therein may be fused to one another at overlapping edges thereof, and a second position in which the first and second mould halves are arranged beside one another and are upwardly open, wherein the pivoting movement of the pivot arm between the first and the second position is assisted by a spring device which utilizes the weight of the pivot arm for the lifting of the pivot arm.

In accordance with embodiments, a method for producing plastics containers includes at least one of: inserting heated plastics panels into a first, upwardly open mould half and a second, upwardly open mould half, thermoforming the plastic panels in the first and second mould halves to form plastics half-shells, wherein the first mould half is arranged on a first press table and the second mould half is arranged on a pivot arm, wherein the pivot arm is initially situated in a second position in which the first and second mould halves are arranged beside one another and are upwardly open, manipulating the pivot arm, after the thermoforming, from the second position to a first position over the first press table in which first position the first and second mould halves are open towards one another, pressing the first mould half onto the second mould half and fusing the plastics half-shells to one another at overlapping edges thereof, wherein the pivoting movement of the pivot arm between the first position and the second position is assisted by a spring device which utilizes the weight of the pivot arm for the lifting of the pivot arm.

In accordance with embodiments, provision is accordingly made of a spring device by way of which the pivoting movement of the pivot arm may be at least assisted if a further device, such as for example a geared motor, is provided for the actuation of the pivoting movement. Ideally, the pivoting movement is assisted by the spring device in both pivoting directions between the first position and the second position of the pivot arm, though it is also possible in accordance with the invention for use to be made of a spring device which provides assistance in only one of the two pivoting directions of the pivot arm. The normally high weight of the pivot arm together with at least one mould half situated thereon preloads the spring device during the lowering of the pivot arm, such that the spring device facilitates a subsequent lifting of the pivot arm.

In accordance with embodiments, the spring device may be a hydro-pneumatic or mechanical spring device. A hydro-pneumatic spring device in particular has optimum characteristics such as high spring elasticity, and may furthermore be operated both passively (with constant pressure) and also actively (with controlled pressure).

In accordance with embodiments, the spring device may comprise a hydraulic cylinder and a pressure accumulator. One end of the hydraulic cylinder may be connected to the pivot arm in such a way that an oscillating rotational movement of the pivot arm is assisted by deployment of the hydraulic cylinder.

In accordance with embodiments, the pressure accumulator may in particular be filled partially with a highly pressurized gas, such as nitrogen, and partially with a hydraulic fluid, wherein a diaphragm is arranged between the gas and the hydraulic fluid in the pressure accumulator. Such pressure accumulators are also referred to as "suspension spheres."

In accordance with embodiments, the spring device may comprise a hydraulic pump. By way of the hydraulic pump, it is possible for a hydraulic fluid to be supplied permanently to the pressure accumulator at a constant pressure, or else with a controllable pressure, such that non-uniformities arising for example as a result of the crank motion of the hydraulic cylinder or as a result of gas expansion in the pressure accumulator may be compensated.

In accordance with embodiments, the spring device may have a damping mechanism in order to prevent resonant oscillations of the pivot arm.

In accordance with embodiments, the pivot arm may be pivotable between the first position and the second position by way of a geared motor or a hydraulic motor.

In accordance with embodiments, the pivot arm may be pivotable between the first position and the second position exclusively by the force of an actively controlled spring device. Momentum causes the pivot arm to pass through the dead centre at 90°.

In accordance with embodiments, the pivot arm may comprise a pivot arm stand and a pivotable pivot table which bears the second mould half. Within the context of embodiments, a pivoting movement of the pivot arm then means a pivoting movement of the pivotable pivot table of the pivot arm.

In accordance with embodiments, the hydraulic cylinder may be mounted at its first end, such as, for example, the lower end, on the pivot arm stand and to be connected at its second end, such as, for example, the upper end, to the pivot table.

In accordance with embodiments, the device may further comprise a second press table with a third mould half, a fourth mould half mounted on the pivot arm in which heated and thermoformed plastics half-shells may be received in the third and fourth mould halves. When the pivot arm is in the second position over the second press table, the third and fourth mould halves are open toward one another such that, by virtue of the third mould half being pressed onto the fourth mould half, the plastics half-shells received therein may be fused to one another at overlapping edges thereof. In this case, provision is made for using two press tables on which in each case one mould half is arranged. The two associated mould halves complement the mould halves on the press tables and are arranged on a common pivot arm. In this way, by way of a single pivoting movement of the pivot arm, one mould pair, for example, the first and second mould halves, may be brought together and placed into a position for fusion, and at the same time a second mould pair, for example, the third and fourth mould halves, may be opened for the removal of the fused container. It is also thus possible, while one mould pair is closed and the fused container therein is cooling, for heated plastics panels to already be simultaneously inserted into the mould halves of the other mould pair and thermoformed to form plastics half-shells. The pivoting movements of the pivot arm, which may be pivoted back and forth between a position over the first press table and a position over the second press table, are assisted by the spring device in accordance with embodiments.

In accordance with embodiments, any combination of the first mould half, the second mould half, the third mould half, and the fourth mould half may form one or more thermoforming stations, such that a heated plastics panel may be inserted into the respective mould half and the plastics half-shell is thermoformed in the respective mould half from the plastics panel. The thermoforming station(s) to be in the form of vacuum-type thermoforming stations, such that the plastics panels are pulled into the respective mould halves by a vacuum.

In accordance with embodiments, the second mould half and the third mould half may be arranged on opposite sides of the pivot arm, such that the openings of the mould halves each point away from the pivot arm.

In accordance with embodiments, the pivot arm may be mounted approximately in the middle between the first press table and the second press table, and is pivoted vertically through approximately 180° between the first position and the second position.

In accordance with embodiments, the press of the first press table and/or the second press table may be operated mechanically, hydraulically and/or hydro-pneumatically. In particular, it is possible for at least one of the presses to be operated in at least a two-stage fashion. For example, with a relatively high closing speed and relatively low closing force in a first, high-speed phase, and with a relatively high closing force in a second, force phase. In this way, it may, for example, be provided that the high-speed phase is driven mechanically and the force phase is driven hydraulically.

In accordance with embodiments, a method for producing plastics containers may include at least one of: inserting heated plastics panels into a first, upwardly open mould half arranged on a first press table and a second, upwardly open mould half arranged on a pivot arm initially situated in a second position in which the first and second mould halves are arranged beside one another and are upwardly open; thermoforming the plastic panels in the first and second mould halves to form plastics half-shells; manipulating the pivot arm from the second position into a first position over the first press table in which first position the first and second mould halves are open towards one another; pressing the first mould half onto the second mould half to fuse the plastics half-shells to one another at overlapping edges thereof, wherein the pivoting movement of the pivot arm between the first and the second position is assisted by a spring device which utilizes the weight of the pivot arm for the lifting of the pivot arm.

In accordance with embodiments, that heated plastics panels may also be inserted into a third, upwardly open mould half arranged on a second press table and a fourth, upwardly open mould half arranged on the pivot arm; thermoforming the plastic panels in the third and fourth mould halves to form third and fourth plastics half-shells; manipulating the pivot arm, after the thermoforming, into the second position over the second press table, in which the third and fourth mould halves are open towards one another; pressing the third mould half onto the fourth mould half to fuse the plastics half-shells to one another at overlapping edges thereof.

In accordance with embodiments, the plastics panels may be inserted into the first and second mould halves and also thermoformed while fused-together plastics half-shells are cooling down in the third and fourth mould halves. Plastics panels may also be inserted into the third and fourth mould halves and also thermoformed while fused-together plastics half-shells are cooling down in the first and second mould halves. In that way, in an alternating fashion, the plastic in one mould pair is prepared and thermoformed while a container in the other mould pair is cooling down.

In accordance with embodiments, the plastics panels in at least one of the first mould half, the second mould half, the third mould half and the fourth mould half may be pulled into the respective mould halves by a vacuum for thermoforming purposes.

In accordance with embodiments, insert parts may be inserted into at least one of the first mould half, the second mould half, the third mould half and the fourth mould half after the thermoforming of the plastics half-shells and before the paired fusing of the plastics half-shells. Insert parts may, for example, also be inserted into the plastics half-shells before the thermoforming process.

In accordance with embodiments, the pivot arm or the pivotable pivot table of the pivot arm which bears the second and fourth mould halves may be locked in position before the pressing process, such as, for example, mechanically via a bolt which may be driven into a bore, by way of a pawl or rotary catch, or otherwise electrically, hydraulically or pneumatically, such that the locked pivot arm may withstand the forces during the pressing process.

In accordance with embodiments, a device for producing plastic containers includes at least one of: a first press table including a pivot arm, a first mould half and a second mould half arranged on the pivot arm, the first mould half and the second mould half configured to receive heated and thermoformed plastic half-shells, when the pivot arm is movable between a first position over the first press table in which the first and second mould halves are open toward one another such that, by the first mould half being pressed onto the second mould half, the plastics half-shells may be fused to one another at overlapping edges thereof to form a plastic container, and a second position in which the first and second mould halves are arranged beside one another and are upwardly open; and a bias mechanism to at least assist in the pivoting movement of the pivot arm between the first and the second positions and which utilizes the weight of the pivot arm for the lifting of the pivot arm.

In accordance with embodiments, a device for producing motor vehicle fuel tanks includes at least one of: a first press table including a pivot arm, a first mould half and a second mould half arranged on the pivot arm, the first mould half and the second mould half configured to receive first heated and thermoformed plastic half-shells, when the pivot arm is movable between a first position over the first press table in which the first and second mould halves are open toward one another such that, by the first mould half being pressed onto the second mould half, the first heated and thermoformed plastics half-shells are fused to one another at overlapping edges thereof to form a first fuel tank, and a second position in which the first and second mould halves are arranged beside one another and are upwardly open; a second press table including the pivot arm, a third mould half and a fourth mould half arranged on the pivot arm, the first mould half and the second mould half configured to receive second heated and thermoformed plastic half-shells, wherein in the second position, the pivot arm is over the second press table in which the third and the fourth mould halves are open toward one another such that, by the third mould half being pressed onto the fourth mould half, the second heated and thermoformed plastics half-shells are fused to one another at overlapping edges thereof to form a second fuel tank; and a bias mechanism to at least partially move the pivot arm between the first and the second positions and which utilizes the weight of the pivot arm for the lifting of the pivot arm.

In accordance with embodiments, a method for producing plastic containers includes at least one of: providing a first press table including a pivot arm, a first mould half and a second mould half arranged on the pivot arm; manipulating the pivot arm from a second position, in which the first and second mould halves are upwardly open and arranged beside one another, to a first position over the first press table in which the first and second mould halves are upwardly open and arranged beside one; inserting heated plastic panels into the upwardly open first mould half and second mould half; thermoforming the heated plastic panels in the first and second mould halves to form plastic half-shells; and pressing the first mould half onto the second mould half and connecting the plastic half-shells in the first and second mould halves to one another at overlapping margins thereof, wherein the pivot arm is manipulated between the first and the second at least partially by a bias mechanism which utilizes the weight of the pivot arm for the lifting of the pivot arm.

DRAWINGS

Embodiments will be illustrated by way of example in the drawings and explained in the description below.

DESCRIPTION

Figure 1:
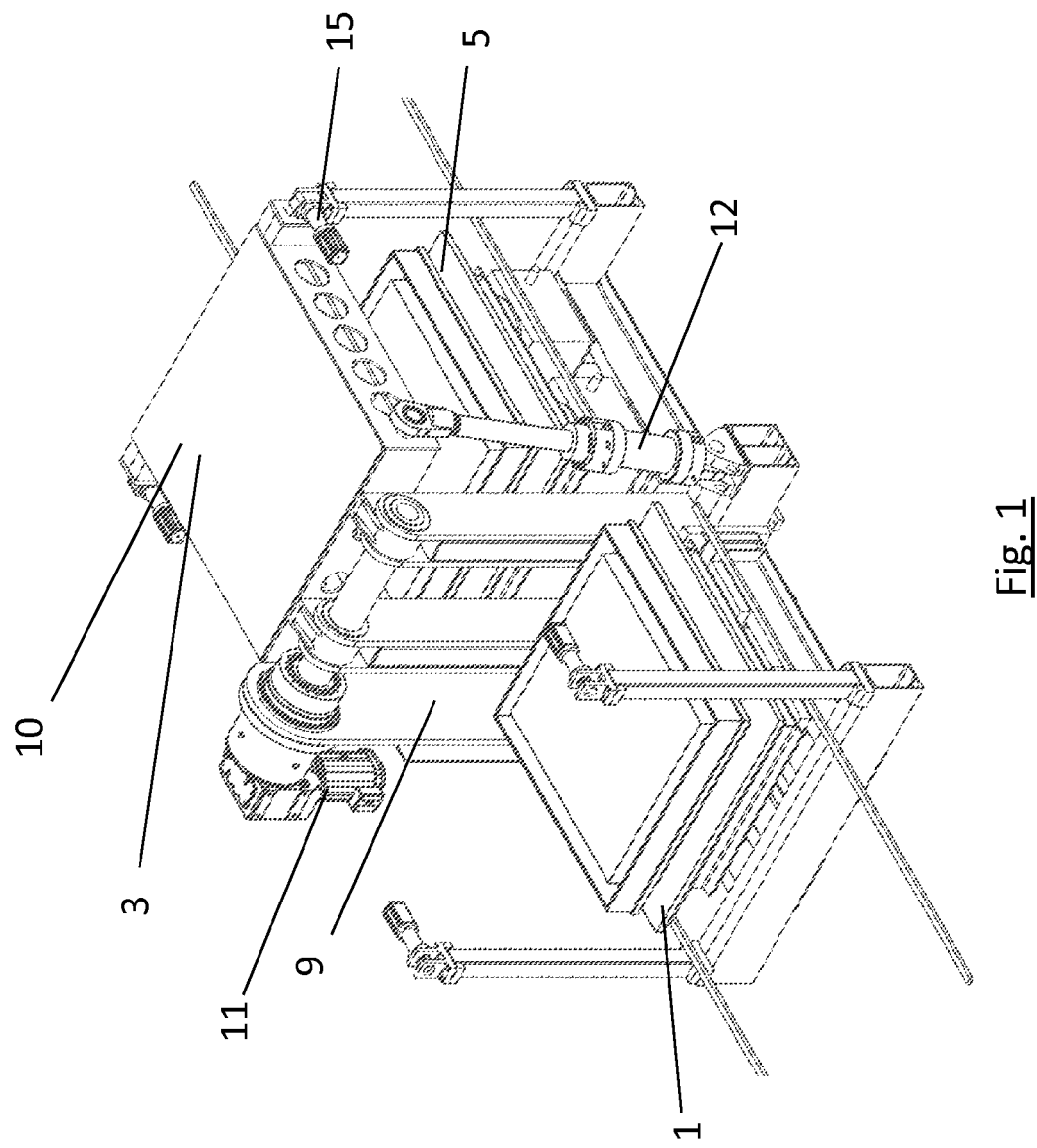
FIG. 1 illustrates a perspective view of a device for producing of plastic containers, in accordance with embodiments.
Figure 2:
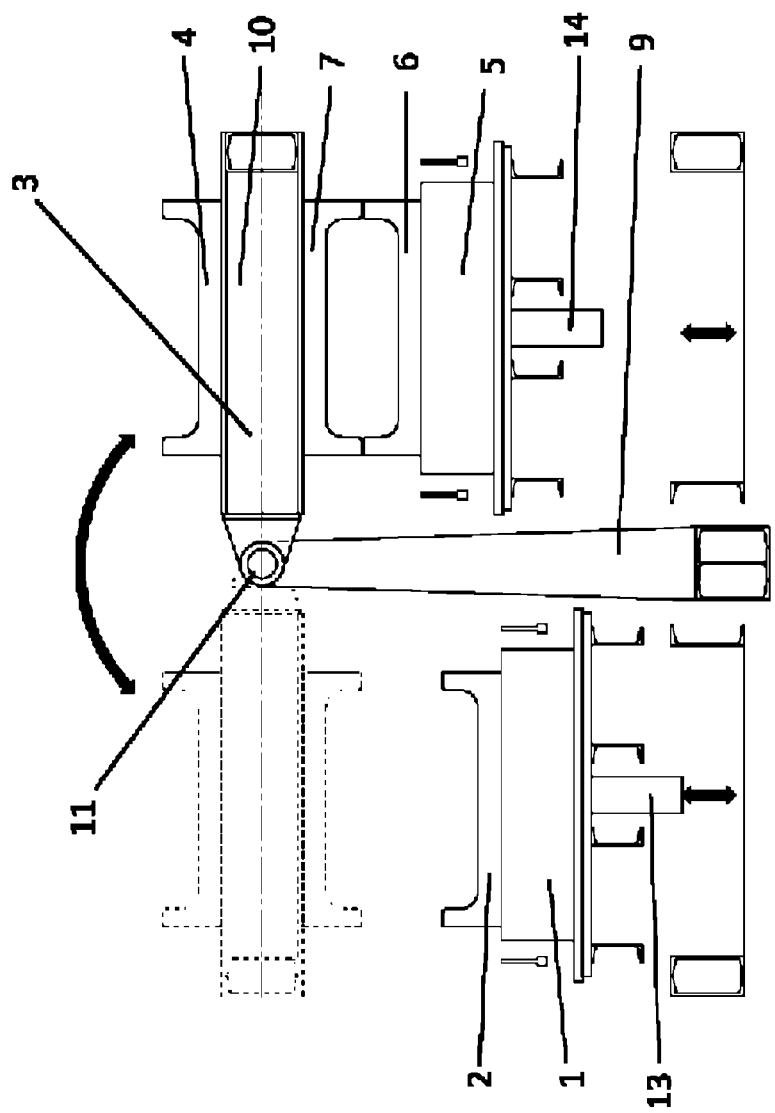
FIG. 2 illustrates a schematic view of a device for producing of plastic containers, in accordance with embodiments.

FIGS. 1 and 2 illustrate a device for producing of plastic containers, in accordance with embodiments. The device comprises a first press table 1, a second press table 5 and a pivot arm 3 between the press tables 1, 5. The pivot arm 3 is composed of a pivot arm stand 9 and a pivot table 10 pivotably mounted on the pivot arm stand 9. The first and the second press tables 1, 5 are associated with a respective press 13, 14. On the first press table 1 is arranged a first mould half 2 which forms an interacting mould pair together with a second mould half 4 which is arranged on the pivot arm 3 on a side of the pivot table 10 which faces toward the first press table 1. Heated and thermoformed plastics half-shells may be received in the first and second mould halves 2, 4. For this purpose, as illustrated in the method illustrated in FIGS. 6 to 11, plastics panels 8 which are kept in approximately planar form are placed onto the mould halves 2, 4 and are thermoformed in the mould halves 2, 4.

The device also has a third mould half 6 on the second press table 5, and the pivot arm 3 has a fourth mould half 7. Heated and thermoformed plastics half-shells may also be received in the third and fourth mould halves 6, 7. FIG. 1 and FIG. 2 each illustrate the pivot arm 3 in a second position of the pivot arm 3, in which the third and fourth mould halves 6, 7 are open toward one another such that, by virtue of the third mould half 6 being pressed onto the fourth mould half 7, the heated, pasty plastics half-shells received therein may be fused to one another at overlapping edges thereof in order to form a closed plastics container 20.

As illustrated in FIG. 1, the pivot arm 3, or the pivot table 10, may be actuated primarily by way of a motor 11, such as, for example, a geared motor. Here, the pivoting movement of the pivot arm 3 may be assisted by a hydro-pneumatic spring device 12, such that the motor 11 may be provided having smaller dimensions. The pivot table 10 may be fixed in a horizontal position by locking mechanism 15 in order that the pivot table 10 withstands the forces during the pressing of the corresponding pairs of mould halves 2, 4, 6, 7 onto one another.

Figure 3:
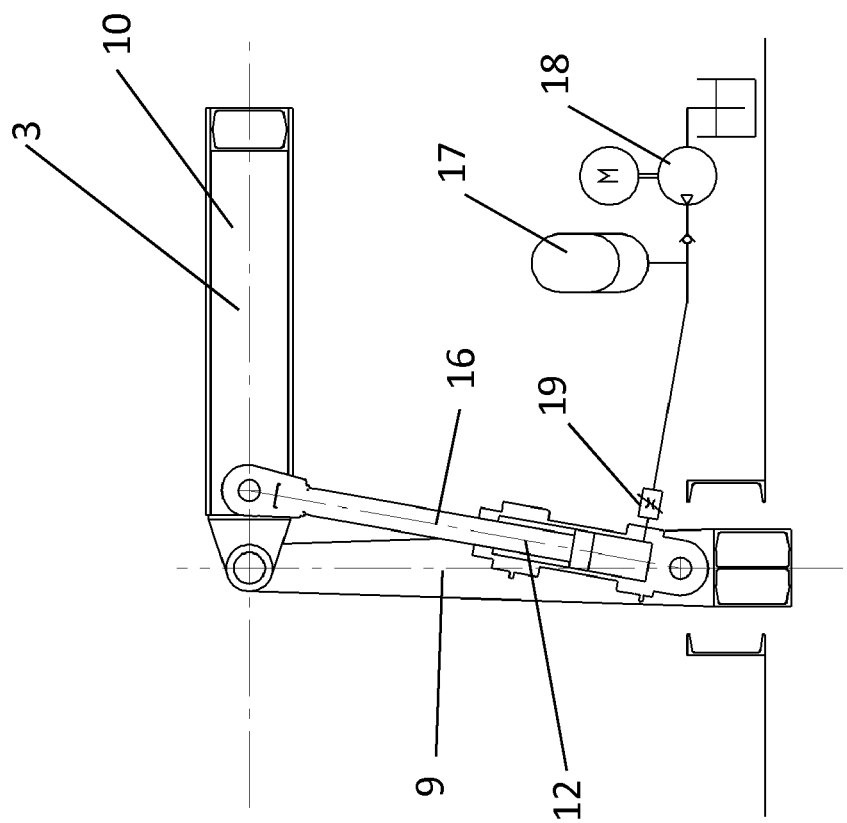
FIG. 3 illustrates a schematic view of a spring assistance for a device for producing of plastic containers, in accordance with embodiments.

FIG. 3 is a schematic illustration of the spring assistance of a device in accordance with embodiments. The assistance of the pivoting movement of a pivot arm 3 is realized by way of a hydro-pneumatic spring device 12 which uses a hydraulic cylinder 16 by way of which a pivot table 10 may be moved. For this purpose, a hydraulic fluid is stored in a pressure accumulator 17. As a result of a downward movement of the pivot table 10, the hydraulic cylinder 16 presses the hydraulic fluid into the pressure accumulator 17, and thus, builds up a pressure that may be utilized for subsequent lifting of the pivot table 10. The pressure of the hydraulic fluid may also be actively controlled, for example, by way of a hydraulic pump 18. To prevent resonant oscillations of the pivot arm 3, a damping mechanism 19 of the spring device 12 may be provided.

Figure 4:
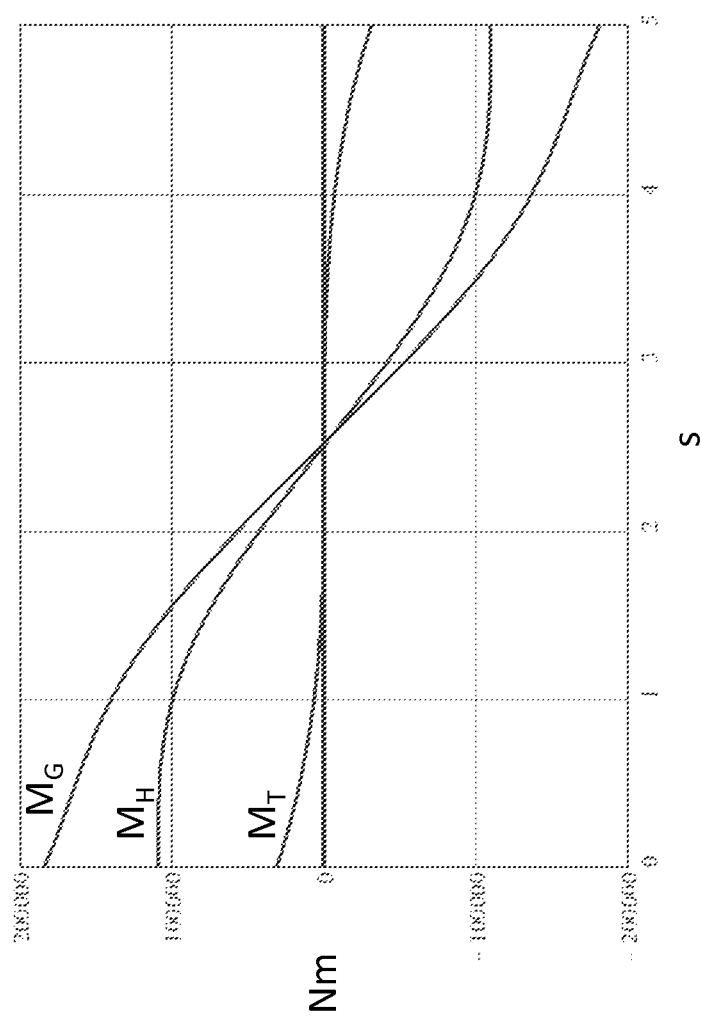
FIG. 4 is a diagram of torque profiles for a pivot arm without spring assistance.

FIG. 4 illustrates a diagram of torque profiles for a pivot arm without spring assistance. Here, torques (plotted in newton-meters) on the y-axis, and a time profile (in seconds) during a pivoting movement (lifting and lowering of the pivot arm and of the pivot table) is plotted on the x-axis. Here, MH is the torque required for lifting the weight of the entire pivot table including mould halves, and MT is the torque additionally required for overcoming the moment of inertia during the acceleration and braking of the entire pivot table. The sum of the required torques MH and MT yields the required torque MG that must be imparted by a geared motor (or some other drive). A high torque is initially required (at the left in the diagram) for the acceleration and lifting of the pivot table, and after the highest position of the pivot table (vertical) has been passed through, a corresponding braking force must be imparted (on the right in the diagram). The energy that must be imparted for the lifting process is lost after the lifting of the pivot table, and the energy imparted for the braking process is likewise lost after the braking of the pivot table.

Figure 5:
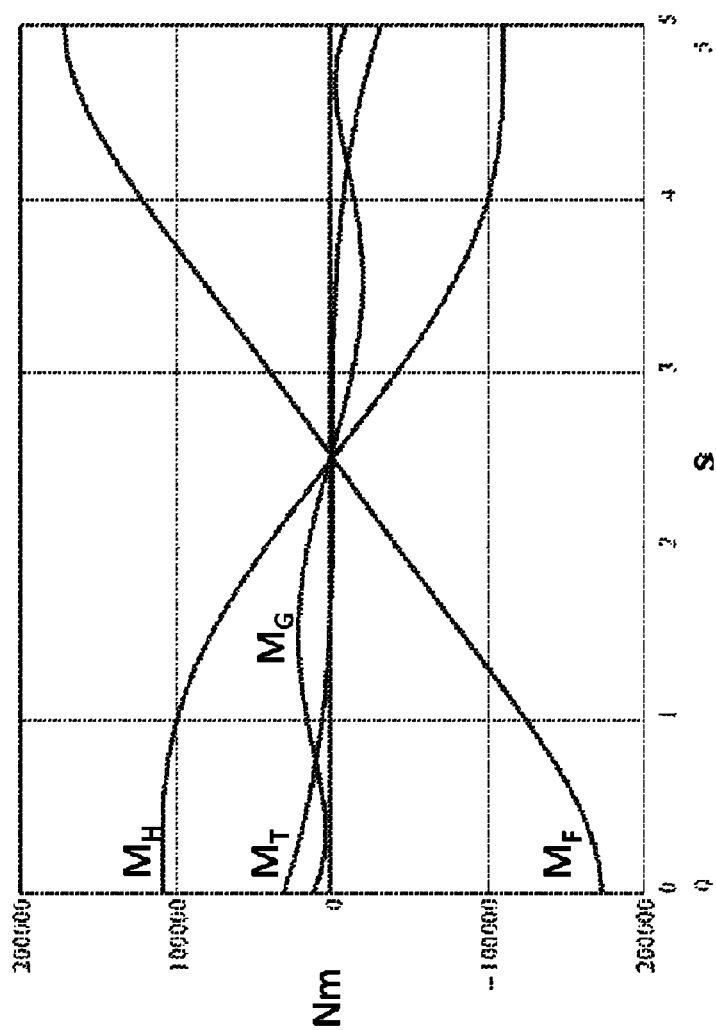
FIG. 5 is a diagram of torque profiles for a pivot arm with spring assistance.

FIG. 5 illustrates a diagram corresponding to FIG. 4, but for a pivot arm with spring assistance. In addition to the required torques MH and MT described with regard to FIG. 4, the torque imparted, for example, by a hydro-pneumatic spring device 12 owing to the preload thereof, MF, now also acts. Owing to the torque MF imparted by the spring device 12, the torque MG that must ultimately be imparted by the geared motor for the lifting and braking processes is reduced considerably, for example, to approximately 15 percent of the value without assistance by the spring device 12.

FIGS. 6 to 11 illustrate a method for producing plastics containers in accordance with embodiments.

Figure 6:
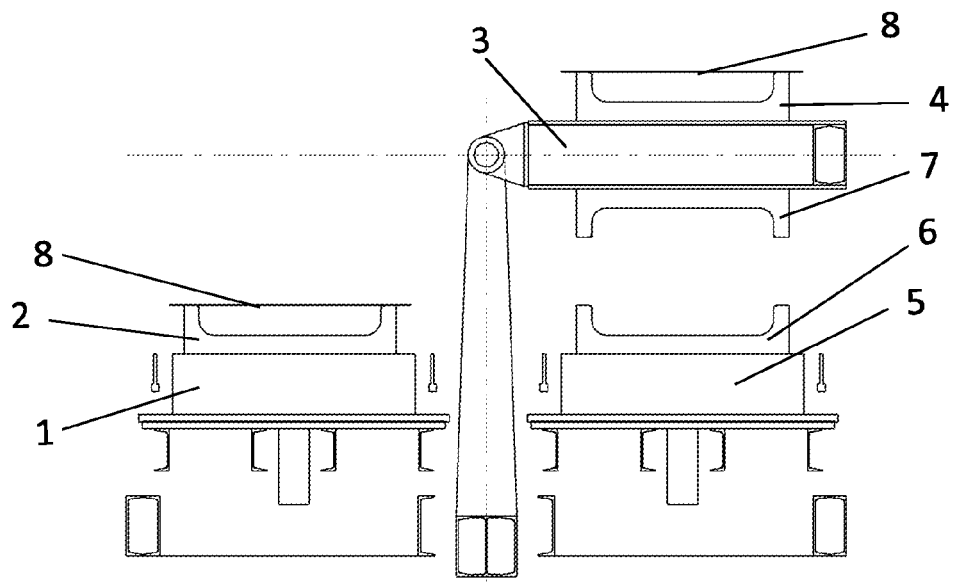
FIGS. 6 to 11 illustrate a method for producing of plastic containers, in accordance with embodiments.

As illustrated in FIG. 6, the pivot arm 3 of the device is in the second position, in which the openings of the third and fourth mould halves 6, 7 are situated opposite one another. The openings of the first mould half 2 and of the second mould half 4 point upward, such that pre-heated plastics panels 8 may be placed on and, at their edges, sealed with respect to the mould halves by way of suitable sealing frames.

Figure 7:
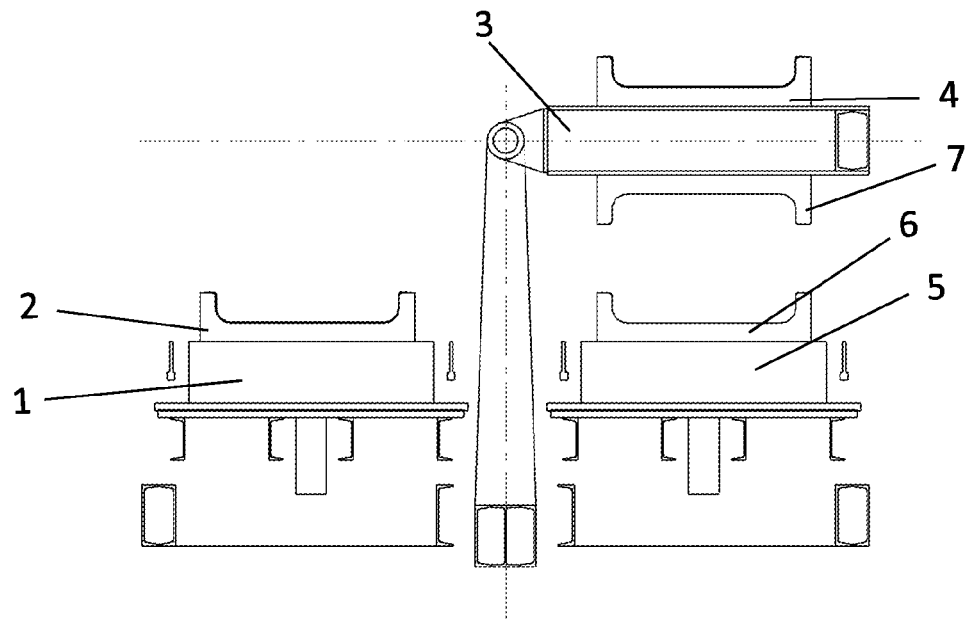

As illustrated in FIG. 7, the plastics panels 8 are then thermoformed in the mould halves 2, 4 by a vacuum such that the plastics panels are pulled into the mould halves 2, 4. It is thereupon possible for insert parts to be inserted into the moulded plastics shells and fastened to the latter, in particular by fusion.

Figure 8:
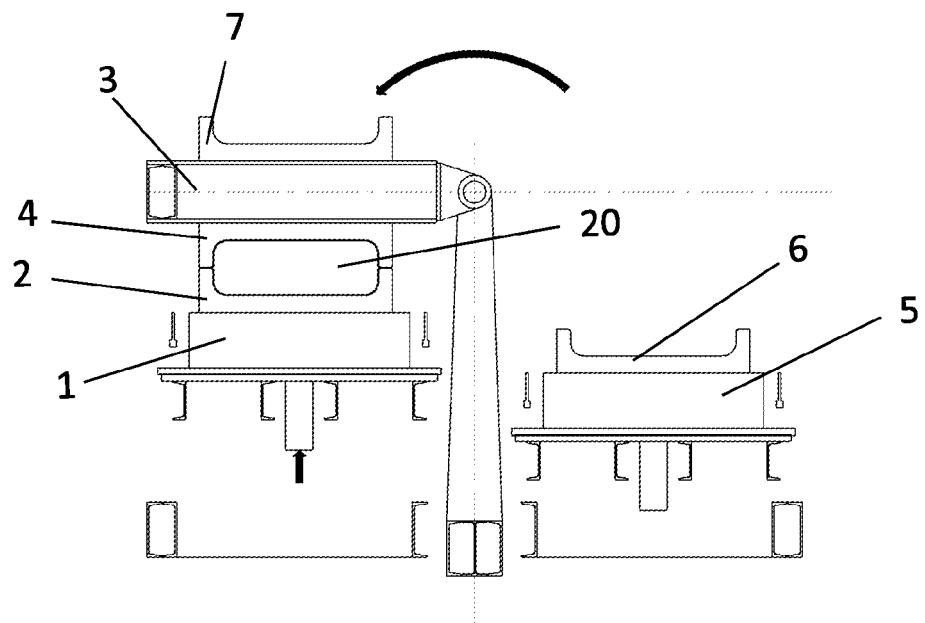

As illustrated in FIG. 8, the pivot arm 3 is then pivoted through 180° (to the left in the figures), from the second position to the first position, in which the openings of the first and second mould halves 2, 4 are situated opposite one another. The first press table 1 moves upward and presses the two plastics shells together, the plastics shells thus being fused to one another at their edges under the action of pressure and heat in order to form a plastics container 20.

Figure 9:
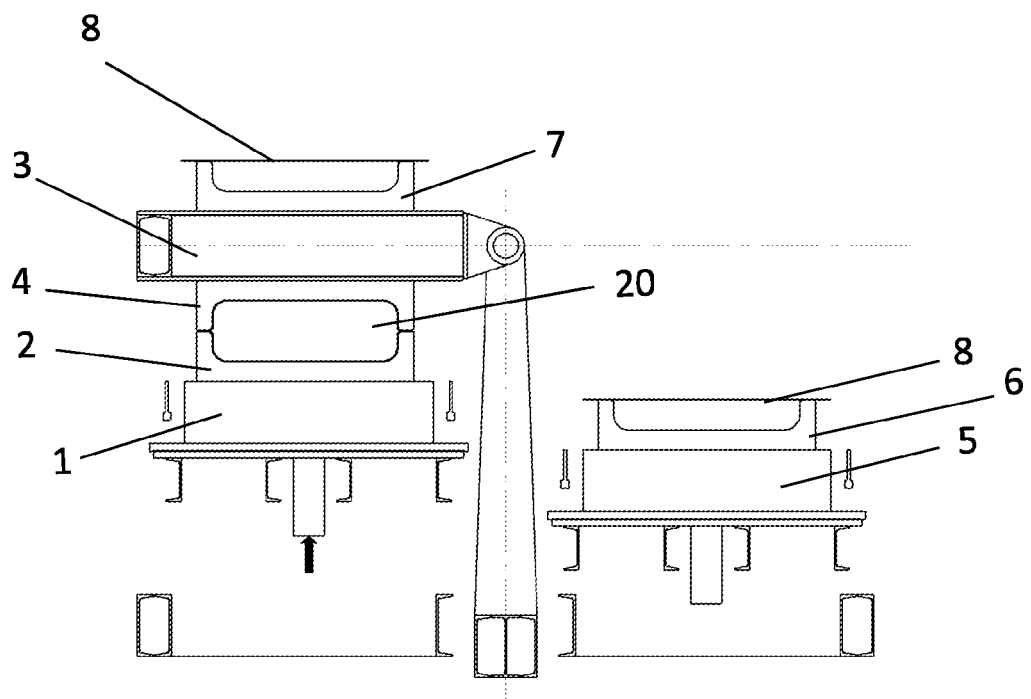

As illustrated in FIG. 9, the pre-heated plastics panels 8 may then be placed onto the now upwardly open mould halves 6 and 7, and, at their edges, sealed with respect to the mould halves by way of suitable sealing frames, while the plastics container 20 formed in the first and second mould halves 2, 4 is cooling down.

Figure 10:
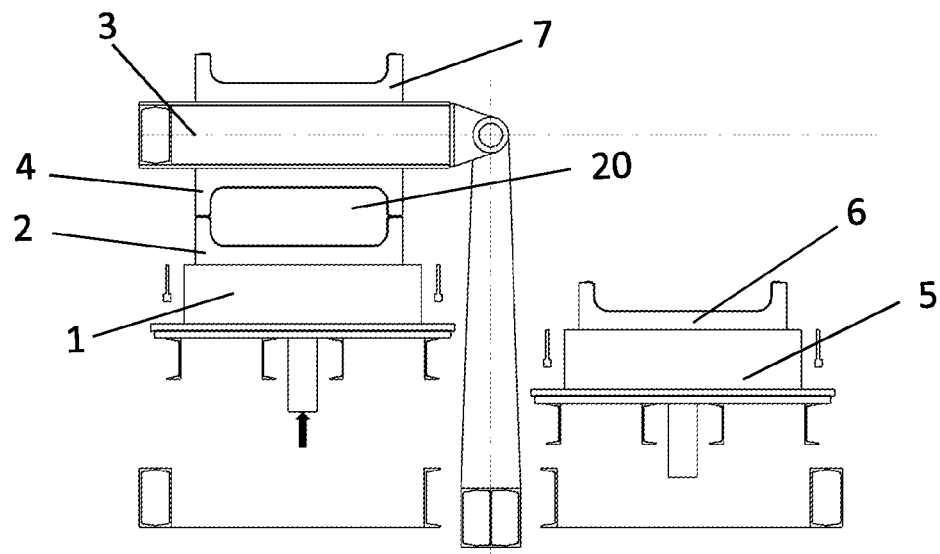

As illustrated in FIG. 10, the plastics panels 8 on the third and fourth mould halves 6, 7 are now vacuum-formed, and insert parts are again inserted into the plastics shells and fused to the latter. During this time, the plastics container 20 in the first and second mould halves 2, 4 cools down further.

Figure 11:
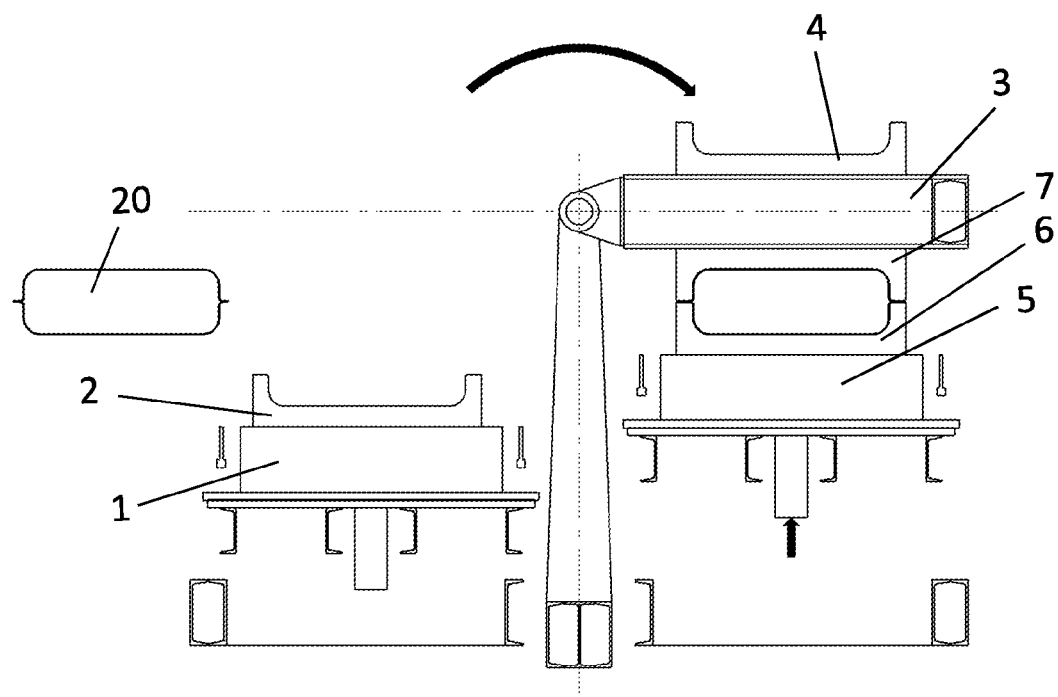

As illustrated in FIG. 11, the first press table 1 may then be lowered again, and the finished plastics container 20 removed, while the pivot arm 3 is pivoted back to the second press table 5 again and a further container is pressed on the second press.

The method in accordance with embodiments may now self-evidently be repeated as often as desired. Upon every pivoting movement of the pivot arm 3, a further finished plastics container 20 is released. The plastics containers 20 produced by way of the first press 13 may be identical to the plastics containers 20 produced on the second press 14, with the plastics containers 20 thus being produced with a higher output. It is also possible, however, to use different mould halves on the press tables, such that two different products may be produced simultaneously.

Figure 12:
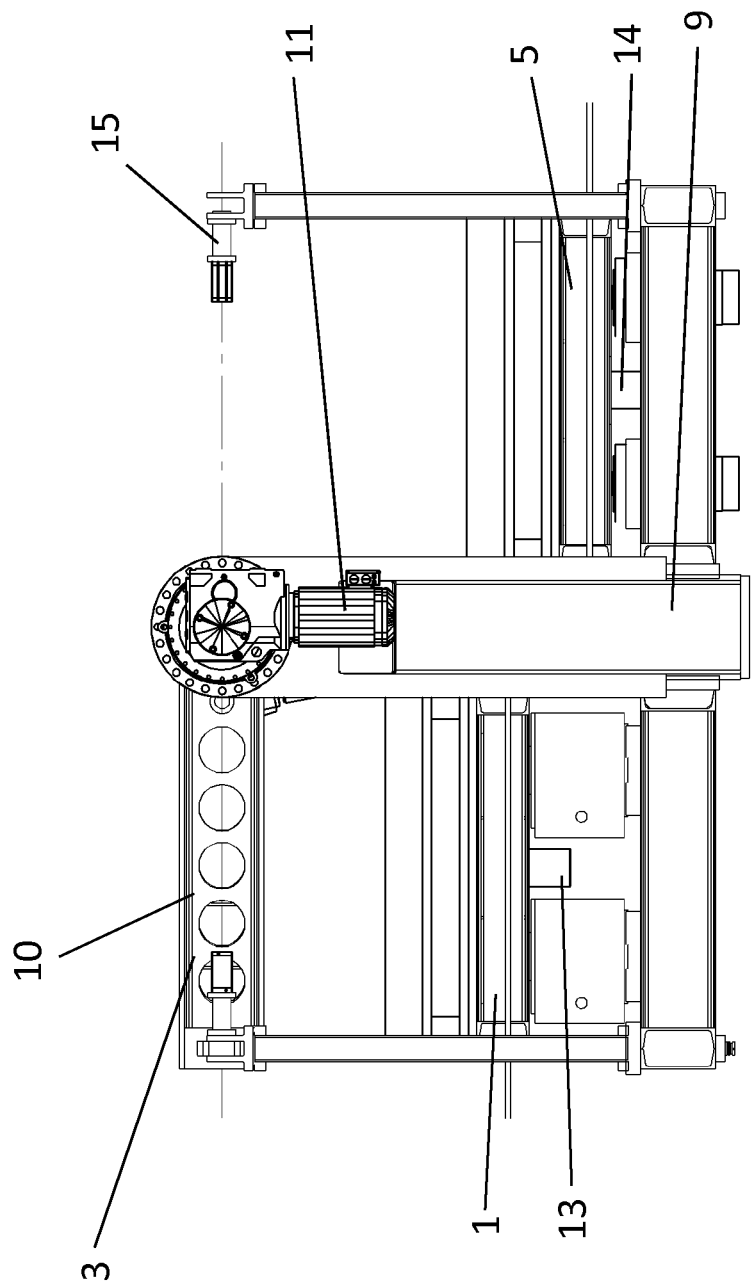
FIG. 12 illustrates a front view of a device for producing of plastic containers, in accordance with embodiments.

As illustrated in FIG. 12, a device for producing plastics containers in accordance with embodiments is provided and viewed from a side at which the containers are withdrawn.

Figure 13:
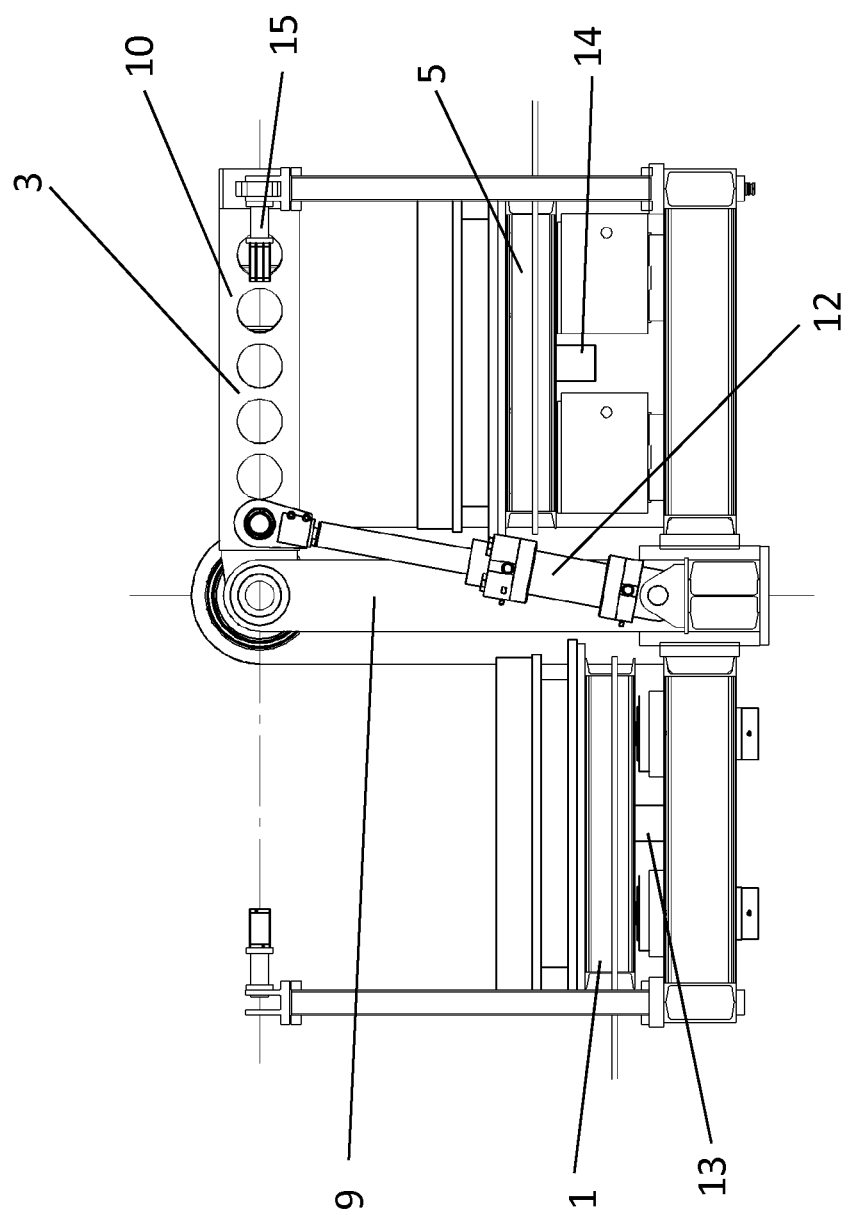
FIG. 13 illustrates a rear view of the device of FIG. 12.

FIG. 13 illustrates a rear view of the device of FIG. 12, for example, from a side from which the plastics panels are supplied.

The term "coupled" or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments may be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

LIST OF REFERENCE SIGNS

1 First press table
2 First mould half
3 Pivot arm
4 Second mould half
5 Second press table
6 Third mould half
7 Fourth mould half
8 Plastics panel
9 Pivot arm stand
10 Pivot table
11 Geared motor 12 Spring device
13 Press
14 Press
15 Locking mechanism
16 Hydraulic cylinder
17 Pressure accumulator
18 Hydraulic pump
19 Damping mechanism
20 Plastics container
$M_H$ Torque required for lifting the weight
$M_T$ Torque required for overcoming the moment of inertia
$M_G$ Torque required from the geared motor
$M_F$ Torque imparted by spring device

What is claimed is:

1. A device for producing plastics containers, comprising:
a first press table including a pivot arm, a first mold half and a second mold half, the second mold half being arranged on the pivot arm, the first mold half and the second mold half configured to receive heated and thermoformed plastic half-shells, when the pivot arm is movable between a first position over the first press table in which the first and second mold halves are open toward one another such that, by the first mold half being pressed onto the second mold half, the plastic half-shells are to be fused to one another at overlapping edges thereof to form a plastic container, and a second position in which the first and second mold halves are arranged beside one another and are upwardly open; and
a bias mechanism to at least partially move the pivot arm between the first and the second positions and which utilizes the weight of the pivot arm for the lifting of the pivot arm,
wherein the second mold is arranged on one side of the pivot arm opposite another side of the pivot arm on which a third mold is arranged.

2. The device of claim 1, wherein the bias mechanism comprises a spring device.

3. The device of claim 2, wherein the spring device comprises one of a hydro-pneumatic or mechanical spring device.

4. The device of claim 2, wherein the spring device comprises a hydraulic cylinder and a pressure accumulator.

5. The device of claim 4, wherein the spring device comprises a hydraulic pump.

6. The device of claim 1, further comprising a motor to manipulate the pivot arm between the first position and the second position.

7. The device of claim 1, wherein the pivot arm comprises a pivot arm stand and a pivotable table upon which the second mold half is arranged.

8. The device of claim 2, wherein:
the spring device comprises a hydraulic cylinder and a pressure accumulator;
the pivot arm comprises a pivot arm stand and a pivotable pivot table upon which the second mold half is arranged; and
the hydraulic cylinder is mounted at a first end of the pivot arm stand and is connected at a second end to the pivot table.

9. A device for producing motor vehicle fuel tanks, comprising:
a first press table including a pivot arm, a first mold half and a second mold half arranged on the pivot arm, the first mold half and the second mold half configured to receive first heated and thermoformed plastic half-shells, when the pivot arm is movable between a first position over the first press table in which the first and second mold halves are open toward one another such that, by the first mold half being pressed onto the second mold half, the first heated and thermoformed plastic half-shells are fused to one another at overlapping edges thereof to form a first fuel tank, and a second position in which the first and second mold halves are arranged beside one another and are upwardly open;
a second press table including the pivot arm, a third mold half and a fourth mold half arranged on the pivot arm, the first mold half and the second mold half configured to receive second heated and thermoformed plastic half-shells, wherein in the second position, the pivot arm is over the second press table in which the third and the fourth mold halves are open toward one another such that, by the third mold half being pressed onto the fourth mold half, the second heated and thermoformed plastics half-shells are fused to one another at overlapping edges thereof to form a second fuel tank; and
a bias mechanism to at least partially move the pivot arm between the first and the second positions and which utilizes the weight of the pivot arm for the lifting of the pivot arm.

10. The device of claim 9, wherein any combination of the first mold half, the second mold half, the third mold half and the fourth mold half comprise one or more thermoforming stations, so that a heated plastic panel is introduced into one respective mold half and the plastic half-shell is thermoformed out of the heated plastic panel in a respective mold half.

11. The device of claim 10, wherein the one or more thermoforming stations comprise vacuum thermoforming stations, so that the heated plastic panels are drawn into the respective mold halves by a vacuum.

12. The device of claim 9, wherein the second mold half and the third mold half are arranged on opposite sides of the pivot arm, such that the opening of the mold halves each point away from the pivot arm.

13. The device of claim 9, wherein the bias mechanism comprises a spring device.

14. The device of claim 13, wherein the spring device comprises one of a hydro-pneumatic spring device, a mechanical spring device, and a hydraulic pump.

15. The device of claim 13, wherein:
the spring device comprises a hydraulic cylinder and a pressure accumulator;
the pivot arm comprises a pivot arm stand and a pivotable pivot table upon which the second mold half is arranged; and
the hydraulic cylinder is mounted at a first end of the pivot arm stand and is connected at a second end to the pivot table.

* * * * *